US008294713B1

(12) United States Patent
Amanieux

(10) Patent No.: US 8,294,713 B1
(45) Date of Patent: Oct. 23, 2012

(54) METHOD AND APPARATUS FOR ILLUMINATING OBJECTS IN 3-D COMPUTER GRAPHICS

(75) Inventor: Antoine Amanieux, New York, NY (US)

(73) Assignee: Adobe Systems Incorporated, San Jose, CA (US)

( * ) Notice: Subject to any disclaimer, the term of this patent is extended or adjusted under 35 U.S.C. 154(b) by 819 days.

(21) Appl. No.: 12/409,281

(22) Filed: Mar. 23, 2009

(51) Int. Cl.
*G06T 15/50* (2006.01)

(52) U.S. Cl. .................. 345/426; 348/419; 348/420

(58) Field of Classification Search .................. None
See application file for complete search history.

(56) References Cited

U.S. PATENT DOCUMENTS

| 4,709,231 | A | * | 11/1987 | Sakaibara et al. | 345/426 |
| 5,635,905 | A | * | 6/1997 | Blackburn et al. | 340/555 |
| 5,900,881 | A | * | 5/1999 | Ikedo | 345/426 |
| 7,724,254 | B1 | * | 5/2010 | Lorach | 345/424 |
| 2002/0126127 | A1 | * | 9/2002 | Fox | 345/581 |
| 2004/0201586 | A1 | * | 10/2004 | Marschner et al. | 345/426 |
| 2005/0001836 | A1 | * | 1/2005 | Day | 345/426 |
| 2009/0141027 | A1 | * | 6/2009 | Sato et al. | 345/426 |

OTHER PUBLICATIONS

James F. Blinn, "Models of light reflection for computer synthesized pictures," Proceedings of the 4th annual conference on Computer graphics and interactive techniques, Year of Publication: 1977, pp. 192-198.

Bui Tuong Phong, "Illumination for computer generated pictures," Communications of the ACM, v.18 n.6, p. 311-317, Jun. 1975.

R. L. Cook, K. E. Torrance, A reflectance model for computer graphics, ACM Transactions on Graphics (TOG), vol. 1, Issue 1 (Jan. 1982), pp. 7-24, 1982.

Amy Gooch Bruce Gooch Peter Shirley Elaine Cohen, "A Non-Photorealistic Lighting Model for Automatic Technical Illustration," 1998.

* cited by examiner

*Primary Examiner* — Said Broome
*Assistant Examiner* — Janice Kau
(74) *Attorney, Agent, or Firm* — Robert C. Kowert; Meyertons, Hood, Kivlin, Kowert & Goetzel, P.C.

(57) ABSTRACT

A method and apparatus for illuminating objects in 3-D computer graphics are described in which a single equation that employs two light sources is used to perform vertex shading. In the vertex shading equation, a direct light source is used to calculate a diffuse component of the lighting, while a rotated light source is used to calculate a specular component of the lighting. Using a single equation that employs two different light sources may provide better lighting for portions of object(s) when compared to conventional vertex shading techniques, while doing so at the same or similar computational cost as conventional techniques that use a single light source to calculate the diffuse and specular components.

31 Claims, 7 Drawing Sheets

METHOD AND APPARATUS FOR ILLUMINATING OBJECTS IN 3-D COMPUTER GRAPHICS

BACKGROUND

Description of the Related Art

Three-dimensional (3-D) computer graphics is concerned with digitally synthesizing and manipulating 3-D visual content. When generating 3-D objects or scenes in 3-D computer graphics, an important portion of the process is illuminating the object or scene to be rendered. Illumination rendering is a method that attempts to capture the way in which light interacts with the object or objects in a scene.

Illumination rendering techniques used in graphics applications such as CAD viewers may have to compromise between providing a visually acceptable illumination (an illumination that gives a good perception of the 3-D object(s)) and the need to render the 3-D objects fast enough to provide acceptable real-time or near-real-time interaction and manipulation of the 3-D objects.

As a result of this need to compromise, illumination techniques that are commonly used in graphics applications render lighting for an object or scene using a single rotated light source (i.e., a light source rotated somewhat from the view vector, the normalized vector from the viewpoint to the origin (0,0,0)) of the directional light type. The directional light type has the lowest computational cost of the light types (omnidirectional, directional, and spotlight) used in graphics applications. A rotated light source may be referred to as a rotated headlamp. A direct light source may be defined as a light source for which the light vector is equal to the view vector. A direct light source may also be referred to as a headlamp, or as a direct headlamp to distinguish from a rotated headlamp. A rotated light source is used rather than a direct light source to avoid the problem of specular saturation that would hide or wash out the diffuse color of the object(s) on all surfaces that are perpendicular to the view vector. Some conventional techniques may employ multiple light sources, for example three fixed light sources, to render the global illumination. However, applying these conventional multiple light source techniques to illuminate an object or scene tends to make the rendering time unaccepably long, as conventional lighting equations such as the Blinn-Phong lighting equation would have to be applied to each light source separately to render the global illumination. Thus, conventional techniques that use multiple light sources tend to be provided as options rather than as default lighting techniques.

For example, illumination techniques that are implemented in many graphics processing units (GPUs) via 3-D APIs such as DirectX® and OpenGL® employ a per-vertex Blinn-Phong lighting equation and per pixel Gouraud interpolation that render illumination for 3-D objects.

A problem with using a single rotated light source is that some visible parts of the 3-D objects may not be sufficiently lit due to the light's rotation. FIG. 1 shows the results of a conventional illumination technique that employs a single rotated light source to render illumination for an example scene. Note that the sides of the four walls facing the human figure are in shadow and that the shading (or color, if this was a color image) of these walls cannot be seen. Simply increasing the ambient color may not provide acceptable results because this would eliminate the shadows and yield a poor visual perception of the 3-D shapes.

SUMMARY

Various embodiments of a method and apparatus for illuminating objects in 3-D computer graphics are described. Embodiments may provide a vertex shading module that implements a single equation which employs two light sources to perform vertex shading. In embodiments, a direct light source is used to calculate a diffuse component of the lighting in the equation, while a rotated light source is used to calculate a specular component of the lighting in the equation. In contrast, conventional techniques employ a rotated light source to compute both components. Using the equation that employs two different light sources allows embodiments of the vertex shading module to provide better lighting for portions of the object(s) that would otherwise be in shadow using only a rotated light source while also avoiding the problem of specular saturation that may occur using only a direct light source. Embodiments may provide improved visual quality when compared to conventional techniques that use a single rotated light source for vertex shading, and at the same or similar computational cost.

In a process of rendering an illuminated 3-D object according to some embodiments, a shape is obtained from which a 3-D model is to be rendered. Any regular geometric shape or arbitrary shape may be processed. In addition to the basic shape, other characteristics of the object may be obtained, which may include, but are not limited to, color characteristics (e.g., emissive and ambient color), texture characteristics, specular characteristics, and so on. A 3-D tessellated surface for the shape is generated.

The vertices of the tessellated surface are then shaded according to a single vertex shading equation which employs two light sources. The vertex shading equation combines the effects of a direct light source (a light source that is on or parallel to the view vector) and a rotated light source in a single equation to provide better lighting than conventional vertex shading that employs a single rotated light source to calculate both diffuse and specular components. In some embodiments of the vertex shading equation, the emissive component and the ambient component may be calculated or otherwise obtained. The diffuse component may be calculated using a direct light source. The specular component may be calculated using a rotated light source. The sum of the values calculated for the components may be summed to generate the lighting/color value at the target vertex. In some embodiments, this operation may be performed at each visible vertex on the surface. Note that the order in which the components are calculated may vary in embodiments.

A two-dimensional (2-D) representation of the 3-D object (the 3-D model) may then be rendered according to the tessellated surface and the shaded vertices of the surface. In some embodiments, to render the 3-D model, an interpolation technique may be applied to generate values for each pixel of the 2-D representation from the shading values generated for the vertices of the surface by the vertex shading module.

While the above generally describes rendering a single 3-D model, the method may be applied to multiple shapes or surfaces in a 2-D representation of a scene to render a 3-D representation of the scene.

Figure 1:
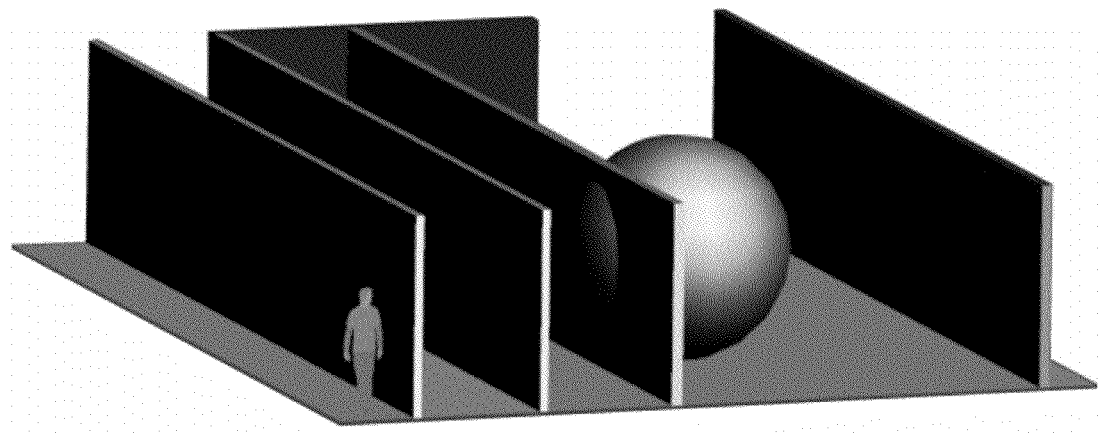
FIG. 1 shows the results of a conventional illumination technique that employs a single rotated light source to render illumination for an example scene.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of a method and apparatus for illuminating objects in 3-D computer graphics are described. Embodiments may provide a vertex shading module that implements a single equation which employs two light sources to perform vertex shading. In embodiments, a direct light source is used to calculate a diffuse component of the lighting in the equation, while a rotated light source is used to calculate a specular component of the lighting in the equation. In contrast, conventional techniques employ a rotated light source to compute both components. Using the equation that employs two different light sources allows embodiments of the vertex shading module to provide better lighting for portions of the object(s) that would otherwise be in shadow using only a rotated light source while also avoiding the problem of specular saturation on surfaces that are perpendicular to the view vector that may occur using only a direct light source.

Figure 2:
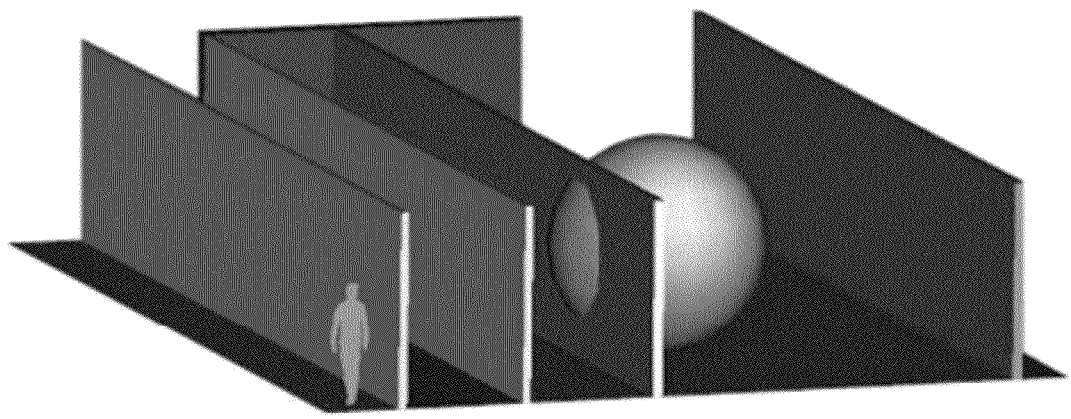
FIG. 2 shows example results of the vertex shading technique employing a direct light source to calculate the diffuse component and a rotated light source to calculate the specular component when rendering illumination for the example scene of FIG. 1, according to embodiments.

Embodiments may provide improved visual quality when compared to conventional techniques that use a single rotated light source for vertex shading, and at similar or the same computational cost. FIG. 2 shows example results of the vertex shading technique employing a direct light source to calculate the diffuse component and a rotated light source to calculate the specular component when rendering illumination for the example scene of FIG. 1, according to embodiments. Note that the sides of the four walls facing the human figure are better lit than in FIG. 1, and that the shading (or colors, if this was a color image) of the walls can be distinguished.

Figure 3A:
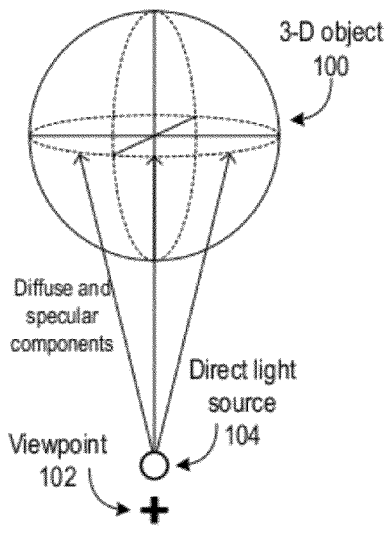
FIGS. 3A and 3B illustrate illumination rendering using a single direct light source.
Figure 3B:
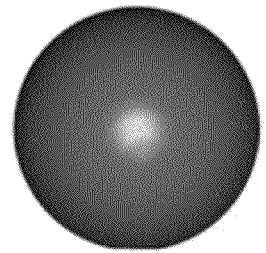

FIGS. 3A and 3B illustrate illumination rendering using a single direct light source. In FIG. 3A, the direct light source 104 lies on a vector parallel to the view vector (the normalized vector from the viewpoint 102 to the origin (0,0,0)). FIG. 3B illustrates a 3-D rendering of the object using the single direct light source 104. The large specular spot in the middle of the 3-D object is typical when using a single direct light source 104. If this were a flat or even just a flatter surface perpendicular to the view vector, for example the front surface of a cuboid, the entire surface may be "washed out" or entirely the color of the specular (typically white) due to specular saturation.

Figure 4A:
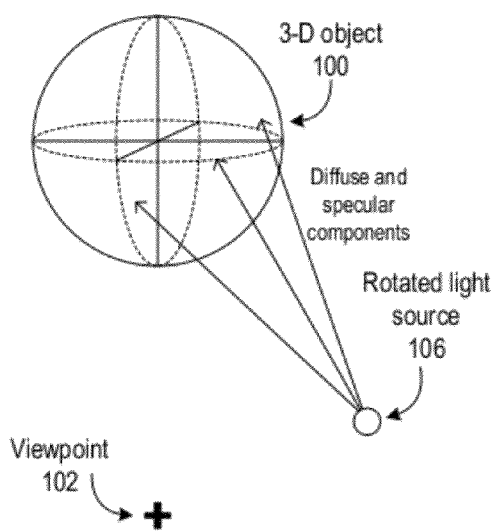
FIGS. 4A and 4B illustrate illumination rendering using a single rotated light source.
Figure 4B:
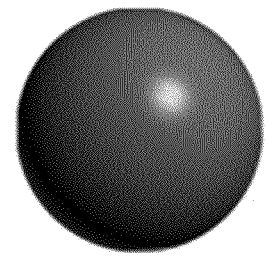

FIGS. 4A and 4B illustrate illumination rendering using a single rotated light source. As shown in FIG. 4A, the light source 106 is rotated off the view vector (away from the viewpoint 102) on one or more axes to some degree. In practice, the light source 106 is generally rotated up and to the right from the view vector. FIG. 4B illustrates a 3-D rendering of the object using the single rotated light source 106. The specular "spot" is rotated up and to the right, and generally avoids the problem of specular saturation that may be present when using a direct light source. However, a portion of the lower left of the 3-D object is completely occluded, and is thus partially or entirely in shadow. Thus, this portion may be rendered as black in the displayed image. This occlusion effect can also be seen on the back side of the four walls in FIG. 1.

Figure 5A:
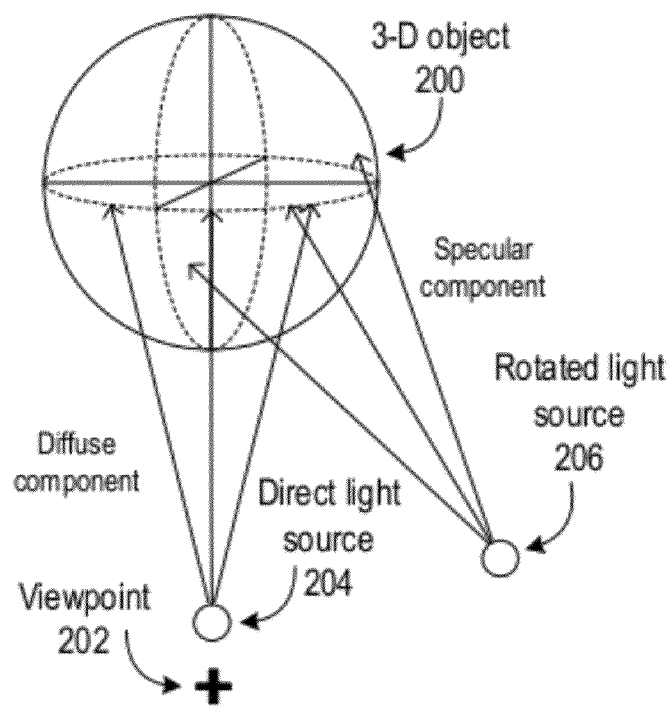
FIGS. 5A and 5B illustrate illumination rendering using a vertex shading technique that implements a single equation which employs two light sources to perform the vertex shading according to embodiments.
Figure 5B:
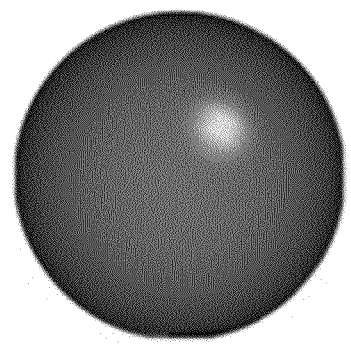

FIGS. 5A and 5B illustrate illumination rendering using a vertex shading technique that implements a single equation which employs two light sources to perform the vertex shading according to embodiments. As shown in FIG. 5A, a direct light source 204 is used to calculate a diffuse component of the lighting in the equation, while a rotated light source 206 is used to calculate a specular component of the lighting in the equation. FIG. 5B illustrates a 3-D rendering of the object using embodiments of the vertex shading technique that employs two light sources. Using the rotated light source to compute specular lighting avoids the specular saturation problem that may be present when using a single direct light source to calculate both diffuse and specular lighting. In addition, using the direct light source to compute diffuse lighting provides better lighting for portions of the object that would otherwise be in shadow if a single rotated light source is used to calculate both diffuse and specular lighting.

Figure 6:
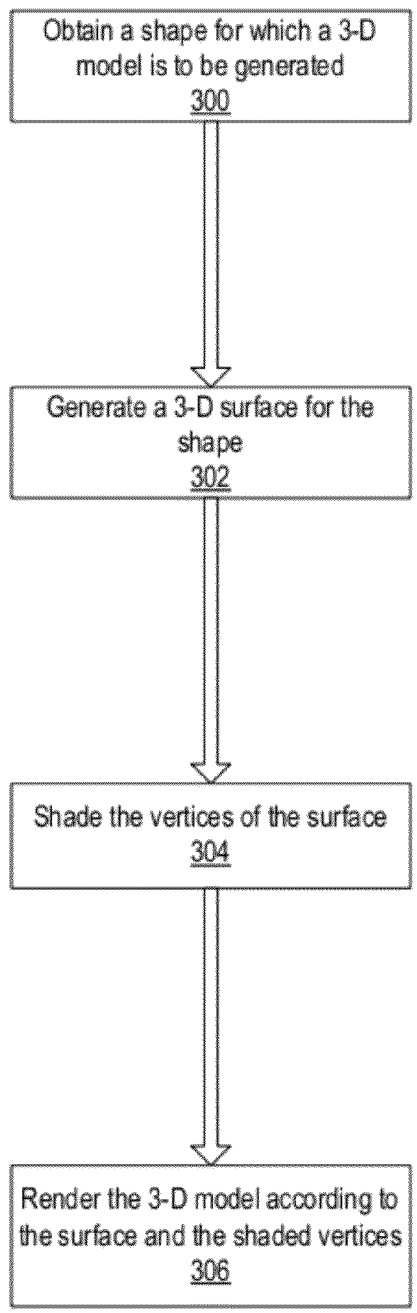
FIG. 6 is a flowchart of an example 3-D object rendering process according to some embodiments.
Figure 7A:
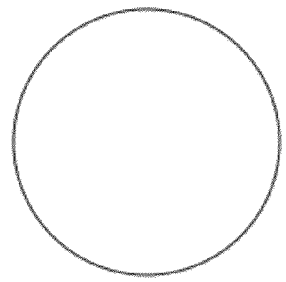
FIGS. 7A through 7D graphically illustrate example results of the elements of the rendering process illustrated in FIG. 6 according to some embodiments.

FIG. 6 and FIGS. 7A through 7D illustrate an example of a process of rendering an illuminated 3-D object according to some embodiments. FIG. 6 is a flowchart of an example 3-D object rendering process according to some embodiments, while FIGS. 7A through 7D graphically illustrate example results of the elements of the rendering process illustrated in FIG. 6. As indicated at 300 in FIG. 6, a shape may be obtained for which a 3-D model is to be generated. For example, the shape may be generated by a user via a user interface to a graphics program. As another example, the shape may be selected from multiple shapes in a scene to be rendered. Other methods of obtaining the shape are possible. In this example, the shape is a circle from which a spherical 3-D object is to be rendered, as illustrated in FIG. 7A. It is to be noted that any regular geometric shape or arbitrary shape may be processed by the method illustrated in FIG. 6. In addition to the basic shape, other characteristics of the object may be obtained, which may include, but are not limited to, color characteristics (e.g., emissive and ambient color), texture characteristics, specular characteristics, and so on.

Figure 7B:
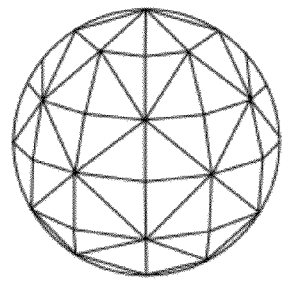

As indicated at 302 in FIG. 6, a 3-D surface for the shape is generated or otherwise obtained. As an example, a tessellation of the shape may be performed to generate a tessellated surface, as shown in FIG. 7B. FIG. 7B shows the surface tessellated into triangles; it is to be noted that other geometric shapes than triangles, or combinations of geometric shapes, may be used to tessellate a surface. Note that other methods than tessellation may be used to generate a surface and to obtain vertices for a surface.

Figure 7C:
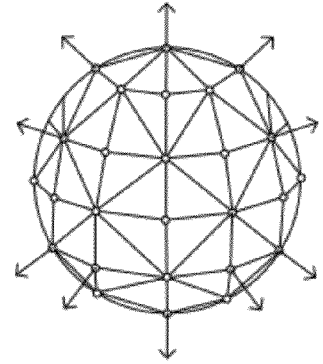
Figure 8:
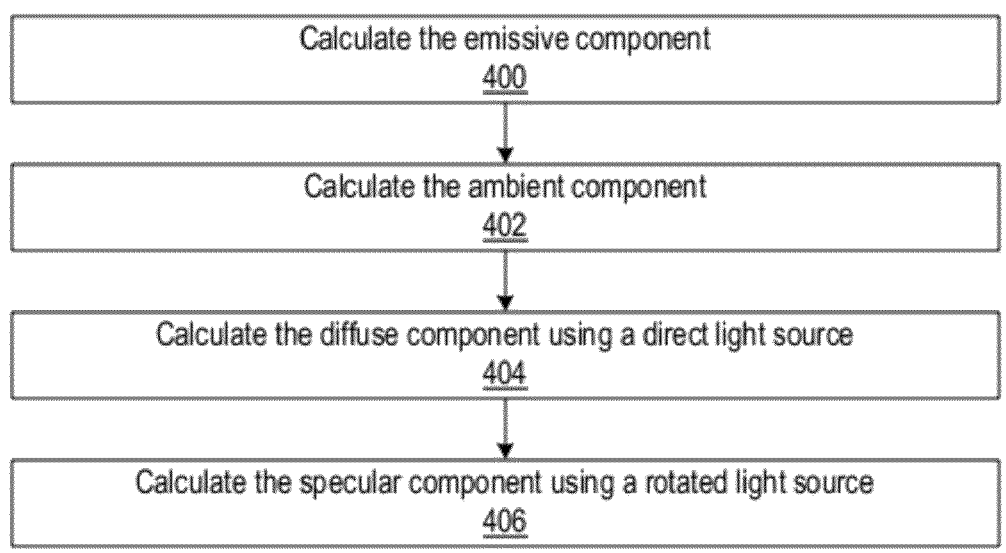
FIG. 8 is a flowchart of a vertex shading equation that may be used in a process of rendering an illuminated 3-D object to calculate the shading for each vertex of a tessellated surface, according to some embodiments.

As indicated at 304 in FIG. 6, the vertices of the surface are shaded. FIG. 7C shows the vertices of the 3-D surface of FIG. 7B as small circles. The arrows represent approximate vertex normals for some of the vertices. Embodiments of the vertex shading module that implement a single vertex shading equation which employs two light sources may be used to perform the vertex shading. The vertex shading equation is applied to generate a shading value for each of the vertices of the surface. Embodiments of the vertex shading module combine the effects of a direct light source (a light source that is parallel to the view vector) and a rotated light source in a single vertex shading equation to thus provide better lighting than conventional vertex shading that employs a single rotated light source to calculate both diffuse and specular components. Using the vertex shading equation that employs two light sources produces fewer visible parts of a rendered 3-D object that are in the shadow of the light sources when compared to conventional techniques that employ a single rotated light source, while also avoiding specular saturation that may result from using a direct light source to compute the specular component. While embodiments may thus produce visually more acceptable results via the use of two light sources in the vertex shading equation, the vertex shading equation has the same or similar computational cost as conventional vertex shading that employs a single direct or rotated light source. FIG. 8, described below, expands on element 304 of FIG. 6.

Figure 7D:
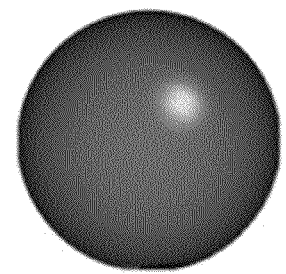

Note that the surface illustrated in FIGS. 7B through 7D is given as an example and is simplified for illustrative purposes, and is not intended to be limiting. In practice, a surface may contain thousands or even millions of vertices, and other shapes than triangles, or combinations of shapes, may be used in a tessellated surface. Furthermore, other methods than a tessellation technique such as is described in FIG. 6 and FIGS. 7A-7D may be used to form a surface and to obtain vertices for the surface.

The vertex shading equation described herein uses a vertex position and a vertex normal for each vertex as input for the 3D geometry. The normal of a vertex may be the normalized average of the surface normals of the faces that contain that vertex. These inputs may be obtained from the vertices of a tessellated surface or from vertices of surfaces obtained from other sources or generated by other techniques. For example, it is possible that geometric objects (such as spheres, cones or more generally any 3D parametric surfaces) may be rendered using the vertex shading equation described herein as the lighting equation of rendering algorithms such as ray tracing, and the vertex position and vertex normal inputs to the vertex shading equation may be obtained from these geometric objects.

As indicated at 306 in FIG. 6, a 2-D representation of the 3-D object (the 3-D model) is rendered according to the tessellated surface and the shaded vertices of the surface. In some embodiments, to render the 3-D model, an interpolation technique may be applied to generate values for each pixel of the 2-D representation from the shading values generated for the vertices of the tessellated surface by the vertex shading module. In some embodiments, Gouraud interpolation may be used; note that other interpolation techniques may also be used in embodiments.

While FIG. 6 generally describes rendering a single 3-D model, the method described in FIG. 6 may be applied to multiple shapes or surfaces in a 2-D representation of a scene to render a 3-D representation of the scene.

FIG. 7D shows an example rendering of the 3-D object (in this example, a sphere) according to embodiments of the illumination rendering technique described herein that uses a single equation that employs two light sources to perform vertex shading. Using the rotated light source to compute specular lighting generally avoids the specular saturation problem that may be present when using a single direct light source to calculate both diffuse and specular lighting. In addition, using the direct light source to compute diffuse lighting provides better lighting for portions of the object that would otherwise be in shadow if a single rotated light source is used to calculate both diffuse and specular lighting.

FIGS. 7A through 7D assume a convex surface for the 3-D model with a rotated light above and to the right of the viewpoint. It is to be noted that a 3-D model may also be rendered to model a concave surface according to embodiments.

In addition, while a rotated light above and to the right of the viewpoint is assumed in FIGS. 7A through 7D and in the other Figures, it is possible for the rotated light to be otherwise oriented, for example above and to the left of the viewpoint, below and to the right of the viewpoint, to the right of the viewpoint but on the horizontal axis, and so on. Further note that while the direct light is generally assumed to be aligned directly with the viewpoint, the direct light may be otherwise oriented, e.g. slightly off-center from the viewpoint on one or more axes. In some embodiments, one or more user interface elements may be provided whereby a user may specify one or more orientation or other parameters for the rotated light and/or the direct light.

Vertex Shading Equation

The following provides more detail for the vertex shading equation that may be used in embodiments. In the vertex shading equation, the diffuse component is computed using a direct light source and the specular component is computed using a rotated light source. Note that this type of lighting does not exist in the real world, but the effect is visually credible for a human observer because it mixes the behavior of two real world light sources.

In the 3-D rendering process as described herein, there are four components for a material of which an object's surface or a portion of the surface are composed: emissive color, ambient color, diffuse color, and specular color. There are three components related to the light: ambient color, diffuse color, and specular color. Generally, a user may specify the desired material for the object, and can specify or modify a value or values for each of the four material components. In some implementations, a user may also specify or modify a value or values for each of the light components. The value at a vertex I may be computed as:

$$I_{color} = \text{(Emissive component)} + \text{(Ambient component)} + \text{(Diffuse component)} + \text{(Specular component)}.$$

The emissive component does not depend on the light. The ambient component depends on the ambient color of the light. The diffuse component depends on the diffuse color of the light, the direction of the light and the normal of the vertex. The specular component depends on the specular color of the light, the position of the eye (the viewpoint), the direction of the light, the position of the vertex, and the normal of the vertex. The normal of a vertex may be the normalized average of the surface normals of the faces that contain that vertex. The specular component mimics the reflection of the light source on the object.

FIG. 8 is a flowchart of a vertex shading equation that may be used in a process of rendering an illuminated 3-D object, for example as illustrated in FIG. 6, to calculate the shading for each vertex of a tessellated surface, according to some embodiments. As indicated at 400, the emissive component may be calculated or otherwise obtained. As indicated at 402, the ambient component may be calculated or otherwise obtained. As indicated at 404, the diffuse component may be calculated using a direct light source. As indicated at 406, the specular component may be calculated using a rotated light source. The sum of the values calculated for the components may be summed to generate the lighting/color value at the target vertex. In some embodiments, this operation may be performed at each visible vertex on the surface. Note that the order in which the components are calculated may be different in some embodiments.

The vertex shading equation illustrated in FIG. 8 and implemented in embodiments of a vertex shading module may be more fully expressed as:

$$I_{color} = E_{color} + (A_{intensity} * A_{color}) + (D_{intensity} * D_{color} * N \cdot L_{direct}) + (S_{intensity} * S_{color} * (H_{rotated} \cdot V)^n)$$

where:
- $I_{color}$ = the lighting/color (shading) calculated for each vertex I of the surface;
- view vector = norm (eye position);
- V = norm (vertex position);
- N = vertex normal;
- $E_{color}$ = emissive color of the material;
- $A_{color}$ = ambient color of the material;
- $D_{color}$ = diffuse color of the material;
- $S_{color}$ = specular color of the material;
- $A_{intensity}$ = light ambient color;
- $D_{intensity}$ = light diffuse color;
- $S_{intensity}$ = light specular color;
- $L_{direct}$ = direct light vector (same as view vector);
- $L_{rotated}$ = rotated light vector;
- $H_{rotated}$ = norm ($V - L_{rotated}$) (this may be referred to as half vector);
- n = specular material power coefficient.

$E_{color}$, $A_{color}$, $D_{color}$, and $S_{color}$ represent the color components of the material, i.e., the color of the object itself. $A_{intensity}$, $D_{intensity}$, and $S_{intensity}$ represent the components of the light. $E_{color}$ represents the color of the object without any lighting, i.e., the intrinsic color of the object. Note that $E_{color}$ is not really present in the real world. $E_{color}$ may be viewed as a mathematical possibility that may be used to boost the lighting of the object. The ambient component does not depend on the direction of the light. The diffuse component may be calculated as the diffuse color of the object multiplied by the diffuse color of the light multiplied by the angle between the normal of the vertex and the direction of the light. The diffuse component does not depend on the vertex position.

This vertex shading equation uses a direct light source in calculating the diffuse component of the color at a vertex, while using a rotated light source in calculating the specular component. By using a direct light source in calculating the diffuse component and a rotated light source in calculating the specular component, more of the visible surface of the object being rendered is illuminated than would be with conventional techniques using just a rotated light source, while also avoiding the problem of specular saturation that may be present using just a direct light source. Further, the calculation is performed in a single lighting equation and at the same or similar computational cost as that incurred by conventional techniques.

Implementations

The vertex shading equation may be implemented as or in a vertex shading module. The vertex shading module may be implemented in software as a software module or in hardware, for example in a vertex shader in a graphics processing unit (GPU). For example, the vertex shading equation described herein may be implemented in a vertex shader in at least some graphics processing units (GPUs) via 3-D APIs such as DirectX® and OpenGL®. Implementing the vertex shading equation in a vertex shader of a GPU via 3-D APIs such as a DirectX® or OpenGL® provides the benefits of hardware acceleration.

Figure 9:
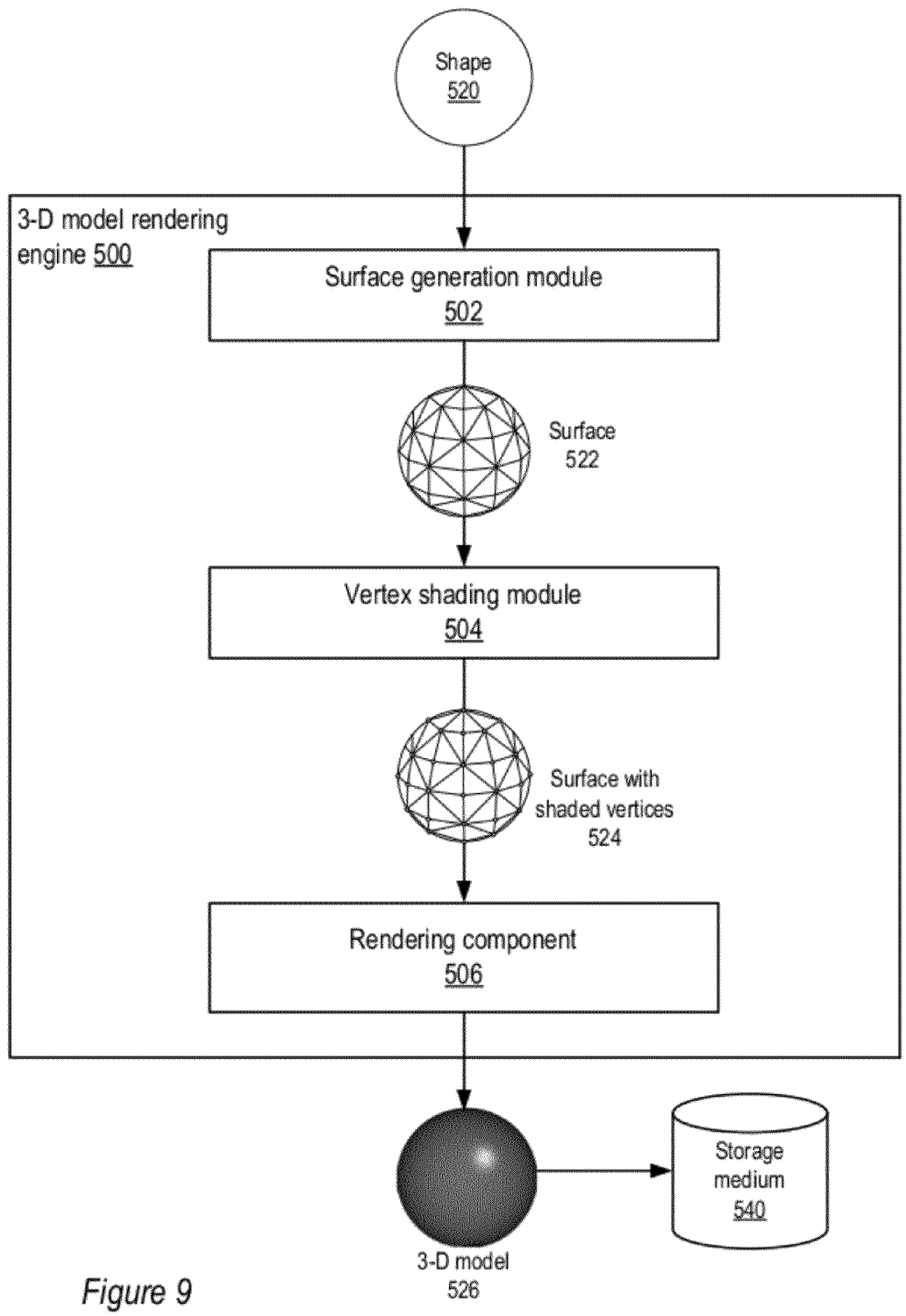
FIG. 9 illustrates an example embodiment of a vertex shading module that may implement a vertex shading equation as illustrated in FIG. 8.

FIG. 9 illustrates an example embodiment of a vertex shading module that may implement the vertex shading equation described herein. FIG. 9 is given as an example, and is not intended to be limiting. Embodiments of the vertex shading module 504 may be implemented or used in a 3-D model rendering engine 500, as illustrated in FIG. 9. The 3-D model rendering engine 500 may be implemented in software or in hardware, for example in a graphics processing unit (GPU), or in a combination of software and hardware.

In operation, 3-D model rendering engine 500 obtains a shape 520 as input. For example, the shape may be generated by a user via a user interface to a graphics program. As another example, the shape may be selected from multiple shapes in a scene to be rendered. Other methods of obtaining the shape are possible. In this example, the shape is a circle from which a spherical 3-D object is to be rendered, as illustrated in FIG. 7A. Any regular geometric shape or arbitrary shape may be processed by the model rendering engine 500. In addition to the basic shape 520, other characteristics of the object may be obtained, which may include, but are not limited to, color characteristics (e.g., emissive and ambient color), texture characteristics, specular characteristics, and so on.

A 3-D surface 522 for the shape is generated by a surface generation module 502. For example, a tessellation of the shape may be performed to generate a tessellated surface. Tessellation is given by way of example and is not intended to be limiting; other methods than tessellation may be used to generate a 3-D surface 522.

The vertices of the surface are shaded by vertex shading module 504 to generate a surface with shaded vertices 524. The vertex shading module 504 applies an embodiment of the vertex shading equation, for example as described above for FIG. 8, which employs two light sources in a single equation to generate a shading value for each of the vertices of the surface 522. The vertex shading equation combines the effects of a direct light source (a light source that is parallel to the view vector) and a rotated light source in a single equation to thus provide better lighting than conventional vertex shading that employs a single rotated light source to calculate both diffuse and specular components of the shading at a vertex. Using the vertex shading equation that employs two light sources produces fewer visible parts of a rendered 3-D object that are in the shadow of the light sources when compared to conventional techniques that employ a single rotated light source, while also avoiding specular saturation that may result from using a direct light source to compute the specular component. Embodiments may produce visually more acceptable results via the use of two light sources in the vertex shading equation with the same or similar computational cost as conventional vertex shading that employs a single direct or rotated light source.

A 2-D representation of the 3-D object (the 3-D model 526) is rendered according to the surface with shaded vertices 524 by a rendering component 506. In some embodiments, to render the 3-D model, an interpolation technique may be applied by rendering component 506 to generate values for each pixel of the 2-D representation from the shading values generated for the vertices of the surface by the vertex shading module 504. In some embodiments, Gouraud interpolation may be used; note that other interpolation techniques may also be used in embodiments.

Some embodiments of the 3-D model rendering engine 500 may provide a user interface that provides one or more textual and/or graphical user interface elements, modes or techniques via which a user may specify the basic shape, other characteristics of the object such as color characteristics, texture characteristics, specular characteristics, etc. The user interface may also provide one or more textual and/or graphical user interface elements, modes or techniques via which a user may perform other operations which may include, but are not limited to, one or more of specifying output files, saving rendered 3-D models, printing, further manipulating or modifying rendered 3-D models, and so on, and in general provide input to and/or control various aspects of 3-D model generation.

In some embodiments of 3-D model rendering engine 500, the vertex shading equation described herein may be provided as an option. For example, a user interface to a 3-D model rendering engine 500 may allow a user to select between a conventional vertex shading equation such as the Blinn-Phong equation that employs a single rotated light source and the vertex shading equation described herein that employs a direct light source to calculate the diffuse component and a rotated light source to calculate the specular component in a single equation.

3-D model 526 may be displayed on a display device (alone or as part of a scene comprising multiple 3-D shapes and/or surfaces), printed, and/or written to or stored on any of various types of memory media, such as storage media or storage devices. Alternatively, or in addition, 3-D model 326 may be provided to another local or remote program, application, or module for further processing.

While FIG. 9 generally describes rendering a single 3-D model, the 3-D model rendering engine 500 illustrated in FIG. 9 may be applied to multiple shapes and/or surfaces in a 2-D representation of a scene to render a 3-D representation of the scene.

Example System

Figure 10:
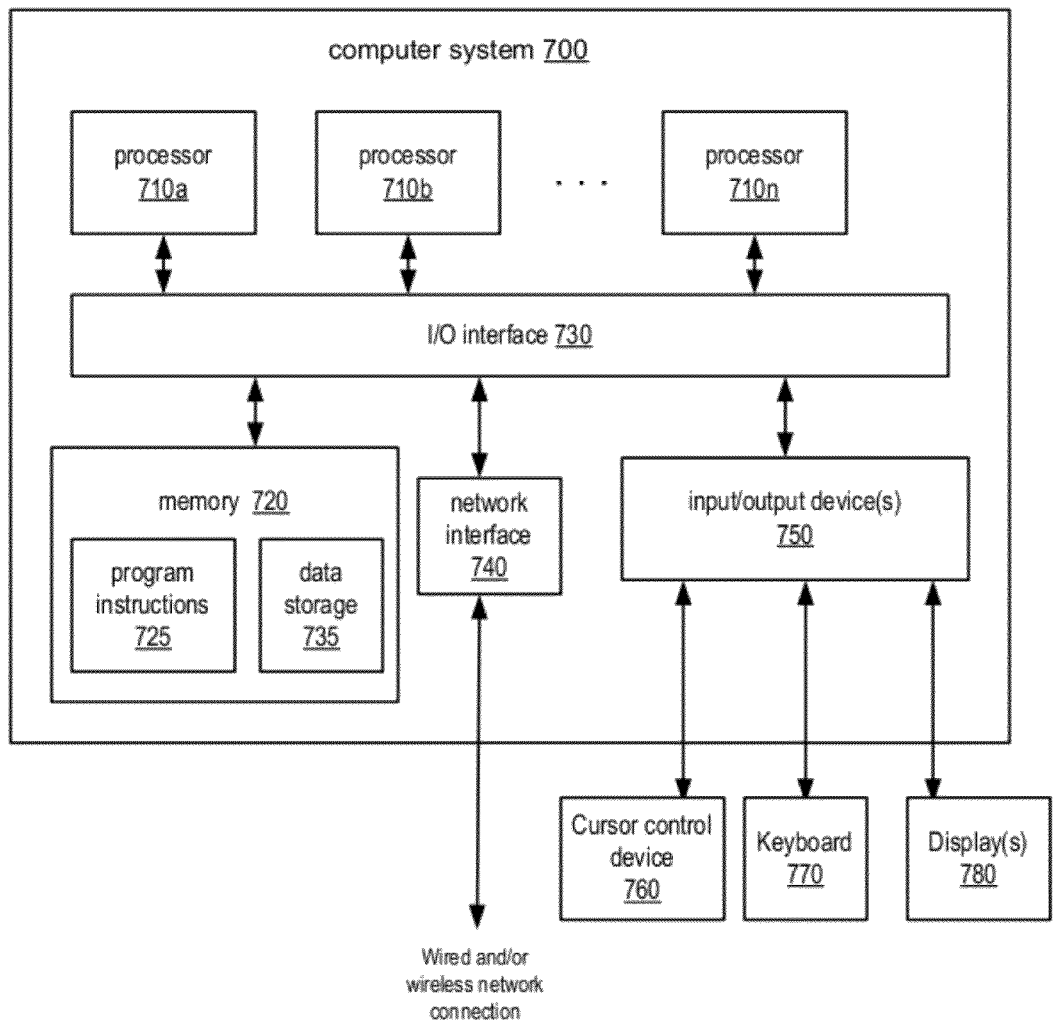
FIG. 10 illustrates an example computer system that may be used in embodiments.

Various components of embodiments of a vertex shading module as described herein may be executed on one or more computer systems, which may interact with various other devices. One such computer system is illustrated by FIG. 10. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in some embodiments, some elements may be implemented via one or more nodes of computer system 700 that are distinct from those nodes implementing other elements. In some embodiments, computer system 700 may be a digital camera.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for vertex shading according to the vertex shading equation described herein may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a vertex shading module, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In some embodiments, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 10, memory 720 may include program instructions 725, configured to implement embodiments of a vertex shading module as described herein, and data storage 735, comprising various data accessible by program instructions 725. In some embodiments, program instructions 725 may include software elements of a vertex shading module as illustrated in the above Figures. Data storage 735 may include data that may be used in embodiments. In other embodiments, other or different software elements and data may be included.

Those skilled in the art will appreciate that computer system 700 is merely illustrative and is not intended to limit the scope of a vertex shading module as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
    obtaining input, on a computer device, specifying a surface for a shape for which a 3-D model is to be rendered, wherein the surface comprises a plurality of vertices;
    calculating a shading value for each vertex of the surface according to a vertex shading equation, wherein the vertex shading equation calculates a diffuse component of the shading value for each vertex according to a diffuse color and direct light vector of a direct light source without calculating a specular component for the direct light source, and calculates a specular component of the shading value for each vertex according to a specular color and rotated light vector of a rotated light source;
    rendering the 3-D model of the shape according to the calculated shading values at the vertices of the surface; and
    displaying the 3-D model on a display device as a tangible 2-D representation of the 3-D model.

2. The computer-implemented method as recited in claim 1, wherein the direct light source is on a vector parallel to a view vector, and wherein the rotated light source is rotated away from the view vector on one or more axes.

3. The computer-implemented method as recited in claim 1, wherein the vertex shading equation further calculates an emissive component of the shading value for each vertex and an ambient component of the shading value for each vertex.

4. The computer-implemented method as recited in claim 3, wherein the vertex shading equation is implemented according to:

shading value at vertex $I$=(emissive component)+(ambient component)+(diffuse component)+(specular component).

5. The computer-implemented method as recited in claim 3, wherein the 2-D shape specifies an outline of an object for which the 3-D model is to be rendered, wherein the object is further specified by a material of which a surface of the object is composed, and wherein the vertex shading equation is implemented according to:

$$I_{color}=E_{color}+(A_{intensity}*A_{color})+(D_{intensity}*D_{color}*N\cdot L_{direct})+(S_{intensity}*S_{color}*(H_{rotated}\cdot V)^n)$$

where:
    $I_{color}$=shading value at vertex I;
    V=vertex position;
    N=vertex normal;
    $E_{color}$=emissive color of the material;
    $A_{color}$=ambient color of the material;
    $D_{color}$=diffuse color of the material;
    $S_{color}$=specular color of the material;
    $A_{intensity}$=ambient color of the light;
    $D_{intensity}$=diffuse color of the light;
    $S_{intensity}$=specular color of the light;
    $L_{direct}$=direct light vector;
    $L_{rotated}$=rotated light vector;
    $H_{rotated}$=half vector (V−$L_{rotated}$); and
    n=specular material power coefficient.

6. The computer-implemented method as recited in claim 1, wherein the surface is a tessellated surface generated according to a tessellation technique, and wherein the plurality of vertices are vertices of the tessellated surface.

7. The computer-implemented method as recited in claim 1, wherein the 3-D model is rendered as a 2-D representation of a 3-D shape comprising a plurality of pixels, and wherein said rendering the 3-D model of the shape according to the calculated shading values at the vertices of the surface comprises applying an interpolation technique that uses the shading values at one or more of the vertices to generate a shading value at each pixel in the 3-D model.

8. The computer-implemented method as recited in claim 1, wherein the vertex shading equation is implemented in software.

9. The computer-implemented method as recited in claim 1, wherein the vertex shading equation is implemented in hardware.

10. The computer-implemented method as recited in claim 9, wherein the hardware is a graphics processing unit (GPU).

11. A system, comprising:
    at least one processor;
    a display device; and
    a memory comprising program instructions, wherein the program instructions are executable by the at least one processor to:
        obtain a surface for a shape for which a 3-D model is to be rendered, wherein the tessellated surface comprises a plurality of vertices;
        calculate a shading value for each vertex of the surface according to a vertex shading equation, wherein the vertex shading equation calculates a diffuse component of the shading value for each vertex according to a diffuse color and direct light vector of a direct light source without calculating a specular component for the direct light source, and calculates a specular component of the shading value for each vertex according to a specular color and rotated light vector of a rotated light source;
        render the 3-D model of the shape according to the calculated shading values at the vertices of the surface; and
        display the 3-D model on the display device.

12. The system as recited in claim 11, wherein the direct light source is on a vector parallel to a view vector, and wherein the rotated light source is rotated away from the view vector on one or more axes.

13. The system as recited in claim 11, wherein the vertex shading equation further calculates an emissive component of the shading value for each vertex and an ambient component of the shading value for each vertex, and wherein the vertex shading equation is implemented according to:

shading value at vertex $I$=(emissive component)+(ambient component)+(diffuse component)+(specular component).

14. The system as recited in claim 11, wherein the shading value for each vertex further comprises an emissive component and a lighting component, wherein the 2-D shape specifies an outline of an object for which the 3-D model is to be rendered, wherein the object is further specified by a material of which a surface of the object is composed, and wherein the vertex shading equation is implemented according to:

$$I_{color}=E_{color}+(A_{intensity}*A_{color})+(D_{intensity}*D_{color}*N \cdot L_{direct})+(S_{intensity}*S_{color}*(H_{rotated} \cdot V)^n)$$

where:
- $I_{color}$ = shading value at vertex I;
- V = vertex position;
- N = vertex normal;
- $E_{color}$ = emissive color of the material;
- $A_{color}$ = ambient color of the material;
- $D_{color}$ = diffuse color of the material;
- $S_{color}$ = specular color of the material;
- $A_{intensity}$ = ambient color of the light;
- $D_{intensity}$ = diffuse color of the light;
- $S_{intensity}$ = specular color of the light;
- $L_{direct}$ = direct light vector;
- $L_{rotated}$ = rotated light vector;
- $H_{rotated}$ = half vector $(V-L_{rotated})$; and
- n = specular material power coefficient.

15. The system as recited in claim 11, wherein the surface is a tessellated surface generated according to a tessellation technique, and wherein the plurality of vertices are vertices of the tessellated surface.

16. The system as recited in claim 11, wherein the 3-D model is rendered as a 2-D representation of a 3-D shape comprising a plurality of pixels, and wherein, to render the 3-D model of the shape according to the calculated shading values at the vertices of the surface, the program instructions are executable by the at least one processor to apply an interpolation technique that uses the shading values at one or more of the vertices to generate a shading value at each pixel in the 3-D model.

17. The system as recited in claim 11, wherein the vertex shading equation is implemented in software by the program instructions.

18. The system as recited in claim 11, wherein the system further comprises a hardware graphics processing unit (GPU), wherein the vertex shading equation is implemented in hardware by the GPU.

19. A non-transitory computer-readable storage medium storing program instructions, wherein the program instructions are computer-executable to implement:
- obtaining a surface for a shape for which a 3-D model is to be rendered, wherein the tessellated surface comprises a plurality of vertices;
- calculating a shading value for each vertex of the surface according to a vertex shading equation, wherein the vertex shading equation calculates a diffuse component of the shading value for each vertex according to a diffuse color and direct light vector of a direct light source without calculating a specular component for the direct light source, and calculates a specular component of the shading value for each vertex according to a specular color and rotated light vector of a rotated light source;
- rendering the 3-D model of the shape according to the calculated shading values at the vertices of the surface; and
- displaying the 3-D model on a display device.

20. The non-transitory computer-readable storage medium as recited in claim 19, wherein the direct light source is on a vector parallel to a view vector, and wherein the rotated light source is rotated away from the view vector on one or more axes.

21. The non-transitory computer-readable storage medium as recited in claim 19, wherein the vertex shading equation further calculates an emissive component of the shading value for each vertex and an ambient component of the shading value for each vertex, and wherein the vertex shading equation is implemented according to:

shading value at vertex I=(emissive component)+(ambient component)+(diffuse component)+(specular component).

22. The non-transitory computer-readable storage medium as recited in claim 19, wherein the shading value for each vertex further comprises an emissive component and a lighting component, wherein the 2-D shape specifies an outline of an object for which the 3-D model is to be rendered, wherein the object is further specified by a material of which a surface of the object is composed, and wherein the vertex shading equation is implemented according to:

$$I_{color}=E_{color}+(A_{intensity}*A_{color})+(D_{intensity}*D_{color}*N \cdot L_{direct})+(S_{intensity}*S_{color}*(H_{rotated} \cdot V)^n)$$

where:
- $I_{color}$ = shading value at vertex I;
- V = vertex position;
- N = vertex normal;
- $E_{color}$ = emissive color of the material;
- $A_{color}$ = ambient color of the material;
- $D_{color}$ = diffuse color of the material;
- $S_{color}$ = specular color of the material;
- $A_{intensity}$ = ambient color of the light;
- $D_{intensity}$ = diffuse color of the light;
- $S_{intensity}$ = specular color of the light;
- $L_{direct}$ = direct light vector;
- $L_{rotated}$ = rotated light vector;
- $H_{rotated}$ = half vector $(V-L_{rotated})$; and
- n = specular material power coefficient.

23. The non-transitory computer-readable storage medium as recited in claim 19, wherein the surface is a tessellated surface generated according to a tessellation technique, and wherein the plurality of vertices are vertices of the tessellated surface.

24. The non-transitory computer-readable storage medium as recited in claim 19, wherein the 3-D model is rendered as a 2-D representation of a 3-D shape comprising a plurality of pixels, and wherein, in said rendering the 3-D model of the shape according to the calculated shading values at the vertices of the surface, the program instructions are computer-executable to implement applying an interpolation technique that uses the shading values at one or more of the vertices to generate a shading value at each pixel in the 3-D model.

25. The non-transitory computer-readable storage medium as recited in claim 19, wherein the vertex shading equation is implemented in software by the program instructions.

26. The non-transitory computer-readable storage medium as recited in claim 19, wherein the vertex shading equation is implemented in hardware by a graphics processing unit (GPU).

27. A graphics processing unit (GPU), configured to:
- obtain a surface for a shape, wherein the surface comprises a plurality of vertices;
- calculate a shading value for each vertex of the surface according to a vertex shading equation, wherein the vertex shading equation calculates a diffuse component of the shading value for each vertex according to a diffuse color and direct light vector of a direct light source without calculating a specular component for the direct light source, and calculates a specular component of the shading value for each vertex according to a specular color and rotated light vector of a rotated light source; and render the 3-D model of the shape according to the calculated shading values at the vertices of the surface;

wherein the 3-D model is configured to be displayed to a display device.

28. The GPU as recited in claim 27, wherein the vertex shading equation further calculates an emissive component of the shading value for each vertex and an ambient component of the shading value for each vertex, and wherein the vertex shading equation is implemented according to:

shading value at vertex $I$=(emissive component)+(ambient component)+(diffuse component)+(specular component).

29. The GPU as recited in claim 27, wherein the surface is a tessellated surface generated according to a tessellation technique, and wherein the plurality of vertices are vertices of the tessellated surface.

30. The GPU as recited in claim 27, wherein the 3-D model is rendered as a 2-D representation of a 3-D shape comprising a plurality of pixels, and wherein, to render the 3-D model of the shape according to the calculated shading values at the vertices of the surface, the GPU is configured to apply an interpolation technique that uses the shading values at one or more of the vertices to generate a shading value at each pixel in the 3-D model.

31. A computer-implemented method, comprising:

executing instructions on a specific apparatus so that binary digital electronic signals representing a surface for a shape for which a 3-D model is to be rendered are obtained, wherein the surface comprises a plurality of vertices;

executing instructions on said specific apparatus so that binary digital electronic signals representing a shading value for each vertex of the surface are calculated according to a vertex shading equation, wherein the vertex shading equation calculates a diffuse component of the shading value for each vertex using a direct light source without calculating a specular component for the direct light source, and calculates a specular component of the shading value for each vertex using a rotated light source;

executing instructions on said specific apparatus so that binary digital electronic signals representing a 3-D model of the shape are rendered according to the calculated shading values at the vertices of the tessellated surface; and storing the binary digital electronic signals representing the 3-D model in a memory location of said specific apparatus for later use.

* * * * *